US00RE37011E

(19) United States
(12) Reissued Patent
Dawson et al.

(10) Patent Number: US RE37,011 E
(45) Date of Reissued Patent: Jan. 9, 2001

(54) ELECTRONIC COMBINATION LOCK UTILIZING A ONE TIME USE COMBINATION

(75) Inventors: Gerald L. Dawson, Lexington; Daniel L. Thompson, Paris, both of KY (US)

(73) Assignee: Mas-Hamilton Group, Inc., Lexington, KY (US)

(21) Appl. No.: 08/906,535

(22) Filed: Aug. 5, 1997

Related U.S. Patent Documents

Reissue of:
(64) Patent No.: 5,488,660
Issued: Jan. 30, 1996
Appl. No.: 08/416,455
Filed: Apr. 3, 1995

U.S. Applications:

(63) Continuation-in-part of application No. 08/139,450, filed on Oct. 20, 1993, now abandoned.

(51) Int. Cl.[7] ..... H04K 1/00; H04L 9/00; G06F 7/04; E05B 49/00

(52) U.S. Cl. ..... 380/24; 70/278; 235/382; 340/825.31; 380/23

(58) Field of Search ..... 380/23, 24, 25; 235/382; 340/825.31; 70/278

(56) References Cited

U.S. PATENT DOCUMENTS

| | | | | |
|---|---|---|---|---|
| 4,213,118 | * | 7/1980 | Genest et al. | 340/149 |
| 4,511,946 | * | 4/1985 | McGahan | 361/172 |
| 4,536,664 | * | 8/1985 | Atalla et al. | 235/379 |
| 4,652,698 | * | 3/1987 | Hale et al. | 380/24 |
| 4,717,816 | * | 1/1988 | Raymond et al. | 235/382.5 |
| 4,797,920 | * | 1/1989 | Stein | 380/24 |
| 4,837,822 | * | 6/1989 | Crosley et al. | 380/23 |
| 5,010,238 | * | 4/1991 | Kadono et al. | 235/379 |
| 5,061,923 | * | 10/1991 | Miller et al. | 340/825.31 |
| 5,089,692 | * | 2/1992 | Tonnesson | 235/382.5 |
| 5,130,519 | * | 7/1992 | Bush et al. | 235/380 |
| 5,140,317 | * | 8/1992 | Hyatt et al. | 340/825.31 |
| 5,148,007 | * | 9/1992 | Kruse | 235/382 |
| 5,163,097 | * | 11/1992 | Pegg | 380/21 |
| 5,170,431 | * | 12/1992 | Dawson et al. | 380/23 |
| 5,224,162 | * | 6/1993 | Okamoto et al. | 380/24 |
| 5,243,654 | * | 9/1993 | Hunter | 380/51 |
| 5,321,242 | * | 6/1994 | Heath, Jr. | 235/382 |
| 5,349,345 | * | 9/1994 | Vanderschel | 340/825.31 |

FOREIGN PATENT DOCUMENTS

| | | | |
|---|---|---|---|
| 0459781 | * | 12/1991 | (EP) . |
| 0546701 | * | 6/1993 | (EP) . |

* cited by examiner

*Primary Examiner*—Stephen C. Buczinski
(74) *Attorney, Agent, or Firm*—Rustan J. Hill

(57) ABSTRACT

A combination lock is described where the combination that is used to open the lock is generated on a separate computer system using information that is contained in the lock and a series of steps that combine selected items of the information contained in the lock and alter the results of the results of the combination of the information items. The lock incorporates a computer processor-which performs the identical steps to generate an authorized combination after a combination is entered into the lock. When the two combinations match, the lock is enabled for opening. At least some of the information items used in the generation of the combinations change with each successful opening of the lock, rendering the combination generated by the computer system useable for only a single opening of the lock.

18 Claims, 8 Drawing Sheets

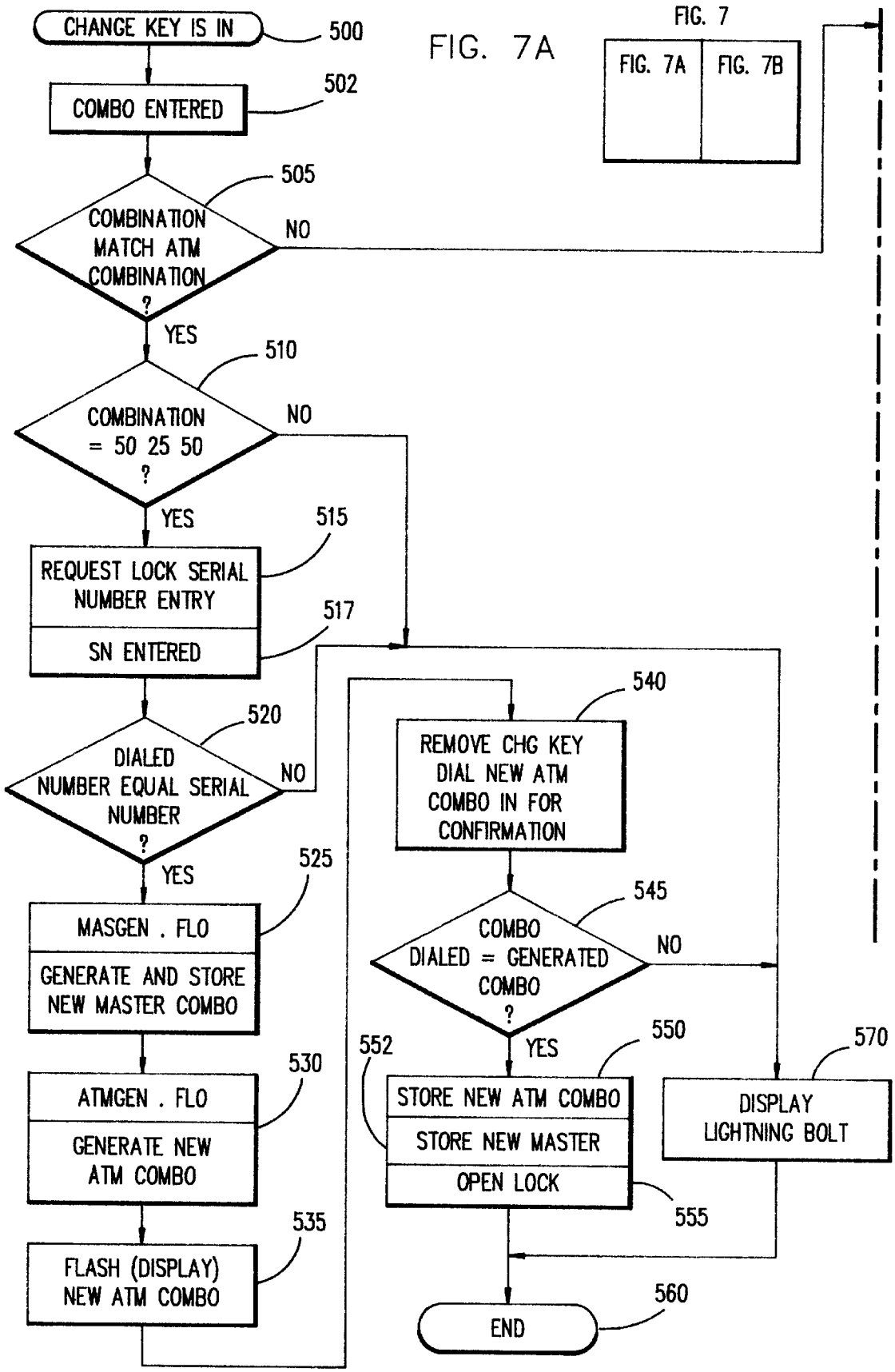
FIG. 7A
FIG. 7
FIG. 7A
FIG. 7B
CHANGE KEY IS IN
500
COMBO ENTERED
502
COMBINATION MATCH ATM COMBINATION ?
505
NO
YES
COMBINATION = 50 25 50 ?
510
NO
YES
REQUEST LOCK SERIAL NUMBER ENTRY
515
SN ENTERED
517
DIALED NUMBER EQUAL SERIAL NUMBER ?
520
NO
YES
MASGEN . FLO
GENERATE AND STORE NEW MASTER COMBO
525
ATMGEN . FLO
GENERATE NEW ATM COMBO
530
FLASH (DISPLAY) NEW ATM COMBO
535
REMOVE CHG KEY DIAL NEW ATM COMBO IN FOR CONFIRMATION
540
COMBO DIALED = GENERATED COMBO ?
545
NO
YES
STORE NEW ATM COMBO
STORE NEW MASTER
OPEN LOCK
550
552
555
DISPLAY LIGHTNING BOLT
570
END
560

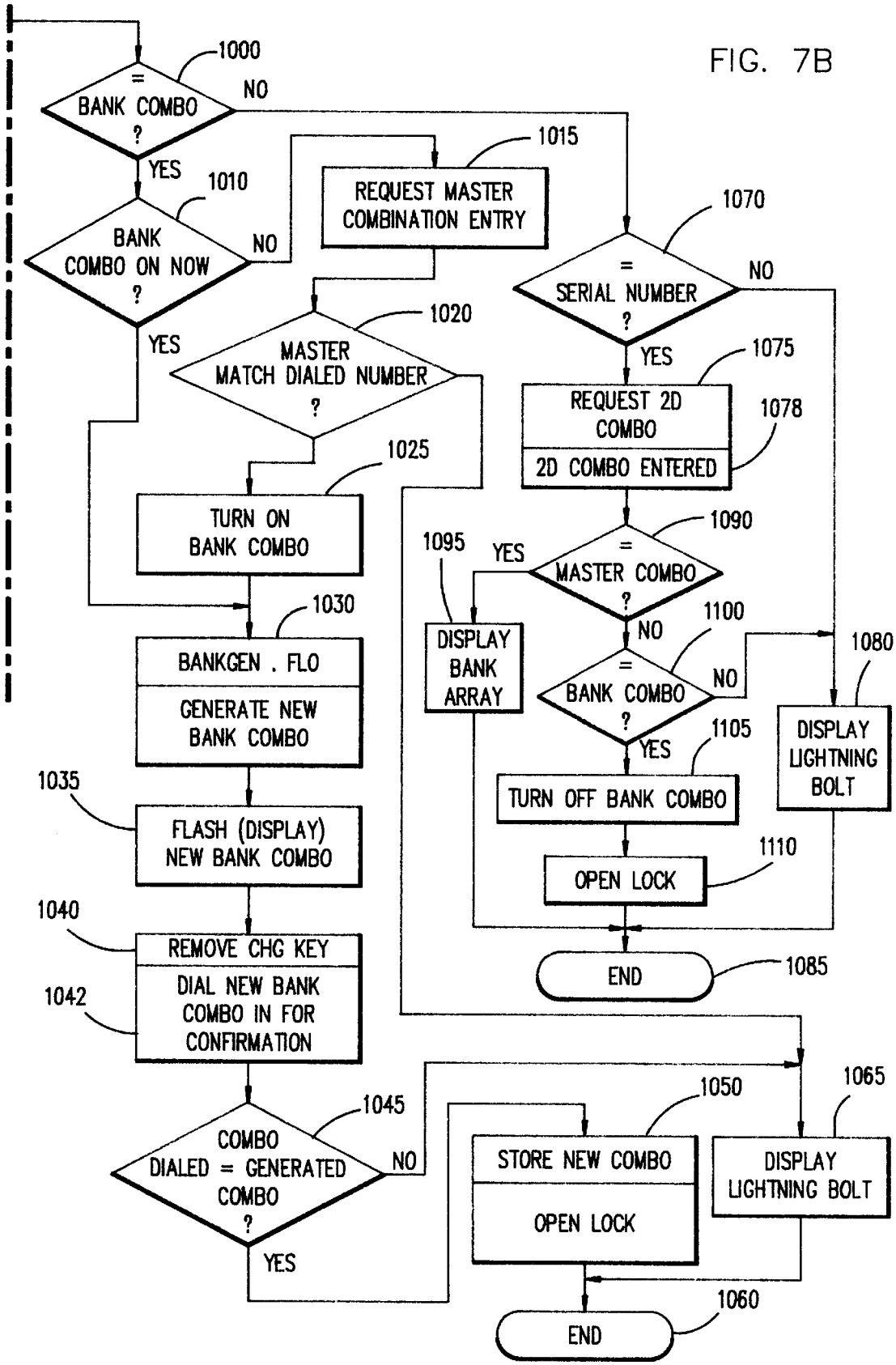
FIG. 7B
1000
= BANK COMBO ?
NO
YES
1010
BANK COMBO ON NOW ?
NO
YES
1015
REQUEST MASTER COMBINATION ENTRY
1020
MASTER MATCH DIALED NUMBER ?
1025
TURN ON BANK COMBO
1030
BANKGEN . FLO
GENERATE NEW BANK COMBO
1035
FLASH (DISPLAY) NEW BANK COMBO
1040
REMOVE CHG KEY
1042
DIAL NEW BANK COMBO IN FOR CONFIRMATION
1045
COMBO DIALED = GENERATED COMBO ?
NO
YES
1050
STORE NEW COMBO
OPEN LOCK
1060
END
1065
DISPLAY LIGHTNING BOLT
1070
= SERIAL NUMBER ?
NO
YES
1075
REQUEST 2D COMBO
1078
2D COMBO ENTERED
1090
= MASTER COMBO ?
YES
NO
1095
DISPLAY BANK ARRAY
1100
= BANK COMBO ?
NO
YES
1105
TURN OFF BANK COMBO
1110
OPEN LOCK
1080
DISPLAY LIGHTNING BOLT
1085
END

ELECTRONIC COMBINATION LOCK UTILIZING A ONE TIME USE COMBINATION

Matter enclosed in heavy brackets [ ] appears in the original patent but forms no part of this reissue specification; matter printed in italics indicates the additions made by reissue.

This application is a continuation-in-part of application Ser. No. 08/139,450 filed Oct. 20, 1993, now abandoned. *Application Ser. No. 09/419,542 filed Oct. 19, 1999 is a continuation of this application.*

FIELD OF THE INVENTION

This invention relates to electronic combination locks and more specifically to electronic combination locks where the lock generates a combination for one-time use, and a separate dispatch computer generates the combination which is to be entered into the lock and compared with the generated combination in the lock.

BACKGROUND OF THE INVENTION

An electronic combination lock of the general type used herein is described in U.S. Pat. No. 5,061,923. The lock described in the above patent is manufactured and sold as the Mas-Hamilton X-07 lock by the Mas-Hamilton Group of Lexington, Ky.

Combination locks are used on containers such as vaults which may, in turn, contain automatic teller machines (ATM). To service or repair an ATM, access within the vault containing the ATM is required. Service and repair involves not only malfunctions, broken or worn out parts of the ATM, but also the replenishment of the cash supply within the ATM and to collect deposits made at the ATM.

Due to the highly sensitive nature of the service or repair of an ATM, it has been customary in the past to use a two-person service/repair team. This concept is used to reduce the chances of theft of the cash either from the cash dispensing unit or from the ATM deposit collection container. The use of two-person service/repair teams is very expensive; and in an effort to reduce the cost of operations of ATMs, the two-person team in many cases has been replaced with a single person to repair/service the ATMs. With the use of only a single service person, the incidences of theft from the ATMs have dramatically increased. Service personnel must have the knowledge of the combination for the lock on the vault in order to gain access to the vault for the normal service or repair function and then the service person might return to the ATM location at a later time, open the vault and remove money therefrom. Also, several people may have been assigned the job of servicing the ATM at different times and, therefore, it is impossible to determine which of the individuals may have taken the money.

To combat this weakness in the security of the ATM and its supply of cash following service by the service personnel, it would be necessary for a second person to go to the ATM in order to change the combination of the lock. This change of the combination requires a lock technician and a considerable amount of time resulting in still additional costs and charges to the organization maintaining and servicing the ATM.

Further, since there are multiple individuals and perhaps very frequent changes of the combination in the lock, it is imperative that very accurate record keeping be performed and that a list of the current combinations for all ATMs being serviced by that particular service organization must be maintained together with a complete listing of the individuals who have had access to the lock with a specific combination.

To avoid implication in theft, a service person might not take money from an ATM when the authorized entry to the ATM is accomplished for the purposes of service or repair.

There is a relatively high turnover rate of employees in this type of an organization and in many cases, the employees leave without notice; therefore, it may be necessary to change the combination on the ATM vault very rapidly after the individual terminates employment with the service organization. If no notice is given, there may be a period of time following the employee's decision to terminate his employment and the recognition of the fact that the employee is not returning. This period of vulnerability would permit the employee to return to the units which he has serviced and for which he still has a current combination. Additionally, the relatively time-consuming procedure to change combinations in mechanical combination locks where the wheels and gate positions must be changed within the lock, would leave additional time of insecure protection for the vault and the ATM.

One example of a lock which has a one-time use combination is the Electronic CA300 lock manufactured and sold by Sequill Corp., 145 W. Main, Barrington, Ill. This lock is provided with a large plurality of authorized combinations, any one of which will open it. After the combination has been used, the lock acts to disable the used combination so that it may not be reused until such time as the lock is restarted. This lock is used primarily to contain and secure a key to a home or other real property so that a real estate agent may open the box and remove the key for purposes of gaining access to the property in order to show the property to a prospective buyer.

A real estate brokerage may put one of these locks on a house which it has listed for sale and then an agent for another brokerage may contact the listing broker for an access combination. Once that number is provided to the showing agent, a notation may be made as to the agent receiving that combination so that any discrepancy at the property may be correlated with the access of that agent.

This lock does not generate the combinations that are authorized for use. The combination is disabled but may be re-authorized upon a restarting of the lock. Further, all of the authorized combinations are stored within the lock and could conceivably be accessed with appropriate electronic access equipment to reveal other usable combinations within the memory of the lock.

Another example of changing combinations in locks include U.S. Pat. No. 4,511,946 issued to W. A. McGanan wherein a hotel room combination is changed upon the departure of each guest or at the check-in of a guest. The combination which was usable by the preceding guest then becomes unusable. However, this combination is only changed upon change of the guest and is changed as a result of a computer control at the registration desk over an electrical connection to the lock or by an indication to the lock that a new combination has been entered by use of a new key. Only upon the indication that a new combination should be accepted will the lock then disregard the previous combination.

SUMMARY OF THE INVENTION

The Mas-Hamilton X-07 lock is provided with enhanced software to operate the microprocessor and to control the lock. The software and the microprocessor in combination operate to receive the dialed combination and upon entry of the dialed combination, the electrical control of the ATM version of the X-07 lock generates an authorized combination. This combination is generated by an algorithm which utilizes the last authorized combination which is invalid for purposes of operating the lock, the serial number of the lock, a randomly changed master combination, and a count of the number of times that the lock has been opened using an authorized ATM combination.

Still further, some of the above values are mathematically modified and the result of the combination of some of the above values further are altered by rotation of the digits within the number or by rotating the binary representation of the resultant combined value. The operation of the algorithm within the microprocessor of the lock results in a six digit decimal form number which is a provisional authorized combination. The provisional authorized combination then is tested to prevent certain selected values, such as the serial number of the lock, the factory-manufactured lock setting, or any one of the other combinations for the lock from being used as the ATM combination. Should the provisional authorized combination be equal to any of the prohibited values, then that provisional authorized combination further is altered by repeating several of the steps of the algorithm and the new provisional authorized combination retested. After the generation and testing of the provisional combination is complete, the generated combination is compared with the entered combination to permit access if the two combinations match. The combination is further tested against preset criteria; and should the combination meet that preset criteria, then a new master combination is generated and stored. The new authorized combination is stored and the seal count of the lock (the count of the number of times that the lock has been opened using an ATM combination) is then incremented. At that point the lock is then conditioned to be opened by the operator.

The lock may also respond to a second combination designated as a bank combination. This provides the opportunity for bank personnel to open the vault of the ATM in order to perform audits, verify the amounts of cash in the ATM or any other function for which only the bank need gain access to the vault without affecting the sequential nature of the combination generation. The seal count is accessed and stored in an array of storage locations thereby providing a historical series of seal counts to indicate each time the bank combination was used to gain access to the ATM vault. Whenever the bank combination opens the lock and permits access to the vault, the seal count is stored but is not updated because the seal count is used as part of the input for generation of the ATM authorized combination; and to update or increment the seal count each time the bank combination is used to gain access, would alter the ability of a dispatching system to remain in synchronism with the generation of the combinations by the lock.

Since the lock is a self-powered lock and the registers of the electronic control require continuous power to preserve contents, the registers of the microprocessor only hold the generated authorized combination during the period the lock is powered. In the event that the combination entered is not matched with the generated combination in the lock, such as when an erroneous combination is entered, the authorized combination is not preserved in the memory registers of the electronic controls past the time the lock is powered. As the powering charge in the lock electronic controls is dissipated with time the contents of the registers within the electronic controls likewise will be dissipated.

Since the combination used to gain access to the vault by opening the lock continually changes and the combination cannot be used more than once, a new combination must be determined and provided to the person to whom the ATM has been assigned for maintenance or service. In order to generate that combination and provide it to the individual who will be servicing or maintaining the ATM, it is necessary to perform the generation algorithm and to use the same identical values that will be used by the lock whenever the lock generates the authorized combination for comparison purposes. This generation may be performed by a computer which has mounted in it an adapter card. The adapter card carries an identical microprocessor to that of the lock and the microprocessor is controlled by a program having an identical combination generating algorithm. The computer may be used as a storage and control facility to hold and maintain the variable values which are used to generate the combination in cooperation with the combination generation algorithm. The algorithm, if known to an individual, will permit the individual to manually generate the authorized combination in the event that all the appropriate variables, functions and values would be known to the individual. While manual generation is possible by one having the algorithm and the necessary variable values, a computer with the adapter card is the preferred approach since this combination generation process then can be carried on very rapidly, efficiently, and with minimum possibilities for error.

Further, in order to prevent access to the combination generation capability of the computer, additional conventional security approaches may be taken such as to require password verification and/or the use of a key in the form of an electronic circuit which may be attached to or inserted into a connector on the computer to indicate that the individual attempting to generate a combination would be an authorized individual.

The adapter card connected into the computer may have different algorithms therein stored in the form of multiple microprocessors which may be alternatively accessed depending upon which specific lock is to be opened. The algorithms may be called in response to the entry of the lock designation or by any other convenient means so long as the appropriate algorithm is accessed for the particular lock to be opened.

The lock may be opened by bank personnel using a constant or unchanging bank combination. The bank combination is initially generated by the lock and will not change with each use. The bank combination may be changed at any time by inserting the change key and dialed bank combination. The new bank combination will be generated and be displayed to the operator so that the operator will then know the new bank combination.

A more detailed understanding of the present invention may be had by referring to the drawings and the detailed description to follow.

DRAWINGS

FIG. 7, composed of FIGS. 7A and 7B, is a flow diagram representation of the initialization process and the processes to turn ON and to turn OFF the bank combination feature of the lock.

Figure 8:
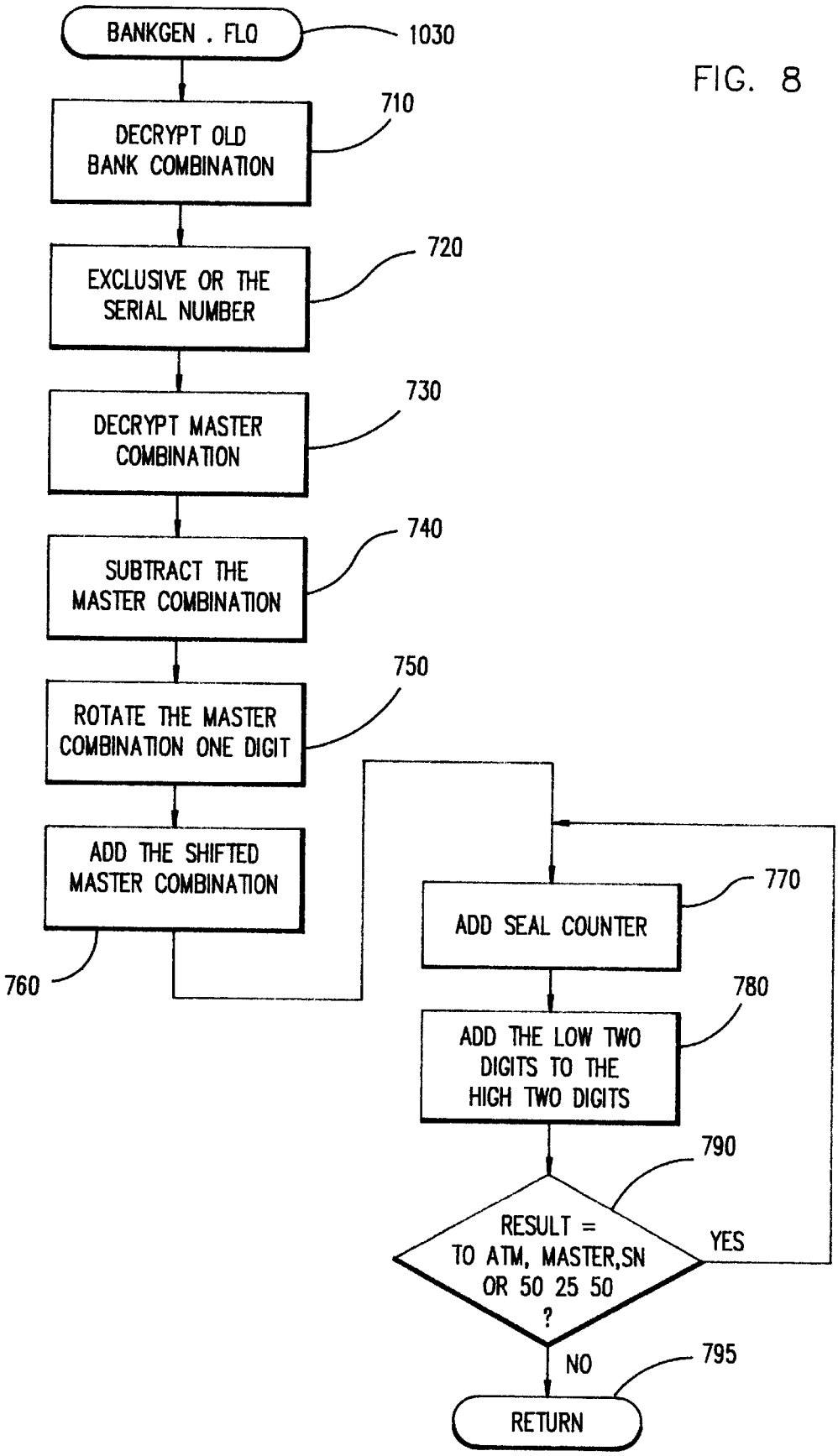

FIG. 8 is a flow diagram representing the process of generating the bank combination.

DETAILED DESCRIPTION OF THE PREFERRED EMBODIMENT OF THE BEST MODE CONTEMPLATED BY THE INVENTOR FOR CARRYING OUT THE INVENTION

The understanding of this invention will be enhanced by setting forth definitions of several terms to be used throughout the following description.

ATM combination—the combination that will open the lock on the container or vault containing the automatic teller machine (ATM) and which is valid only for one use in this lock.

Old ATM combination—the last ATM combination used to open the lock and which is stored in the lock but is incapable of operating the lock a second time.

Bank combination—the combination which will open the lock on the container or vault containing the ATM but which does not change with each use.

Master combination—a combination unique to a single lock which is only used in the generation of other combinations or is used to verify that an individual has the authority to operate the lock in order to set the bank combination feature.

Seal count—the number of times the lock as been successfully opened or the vault "seal" has been broken using the ATM combination.

The operation of the ATM lock is an improved modification of the operation of the Mas-Hamilton Group X-07 lock through the addition of control programs affecting portions of the operation of the lock, yet do not affect the remainder of the X-07 operation.

The newly added portions of the control program will be described in detail below while the previously existing aspects of the X-07 lock will be referred to only generally.

A lock embodying the invention is delivered by the manufacturer in a condition referred to as the production setup. The combination for the ATM combination, the master combination and the bank combination are all set to a 50 25 50 value in the production setup.

A bank or other financial institution which owns and/or operates an ATM may provide service with its own employees to the ATM itself. Alternatively, servicing of the ATM may be contracted to an ATM service firm. In either event the servicing organization will repair the ATM, replenish the cash supply, pick up deposits, and perform periodic preventive maintenance on the mechanisms and elements of the ATM.

Figure 1:
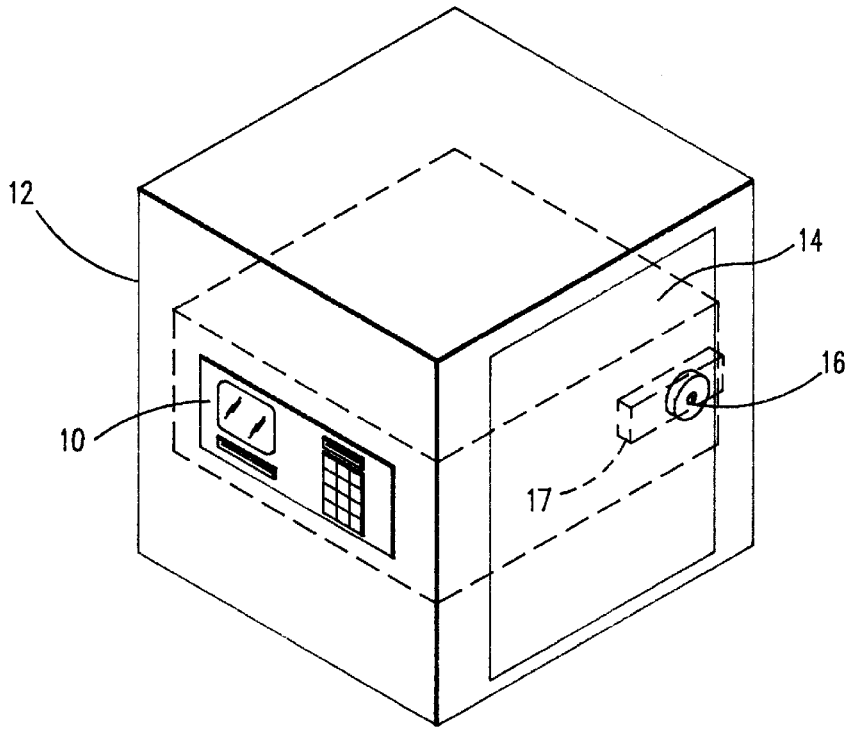
FIG. 1 illustrates an ATM vault containing an ATM machine.

The ATM 10, FIG. 1, is a conventional apparatus purchasable from any of several sources. The ATM 10 is securely enclosed within vault 12. Vault 12 is further mountable within a structure such as a cabinet for use inside a building or a separate structure of sturdy construction, such as a masonry kiosk for free-standing installation.

Vault 12 is provided with a door 14 to permit access to the ATM 10. Door 14 may be on one side or on the back wall of vault 12 as desired or as dictated by the construction of the ATM 10. Electronic combination lock 16 secures the door 14 relative to the vault 12 and prevents access to the ATM without the use of an authorized combination to operate the lock 16.

Figure 2:
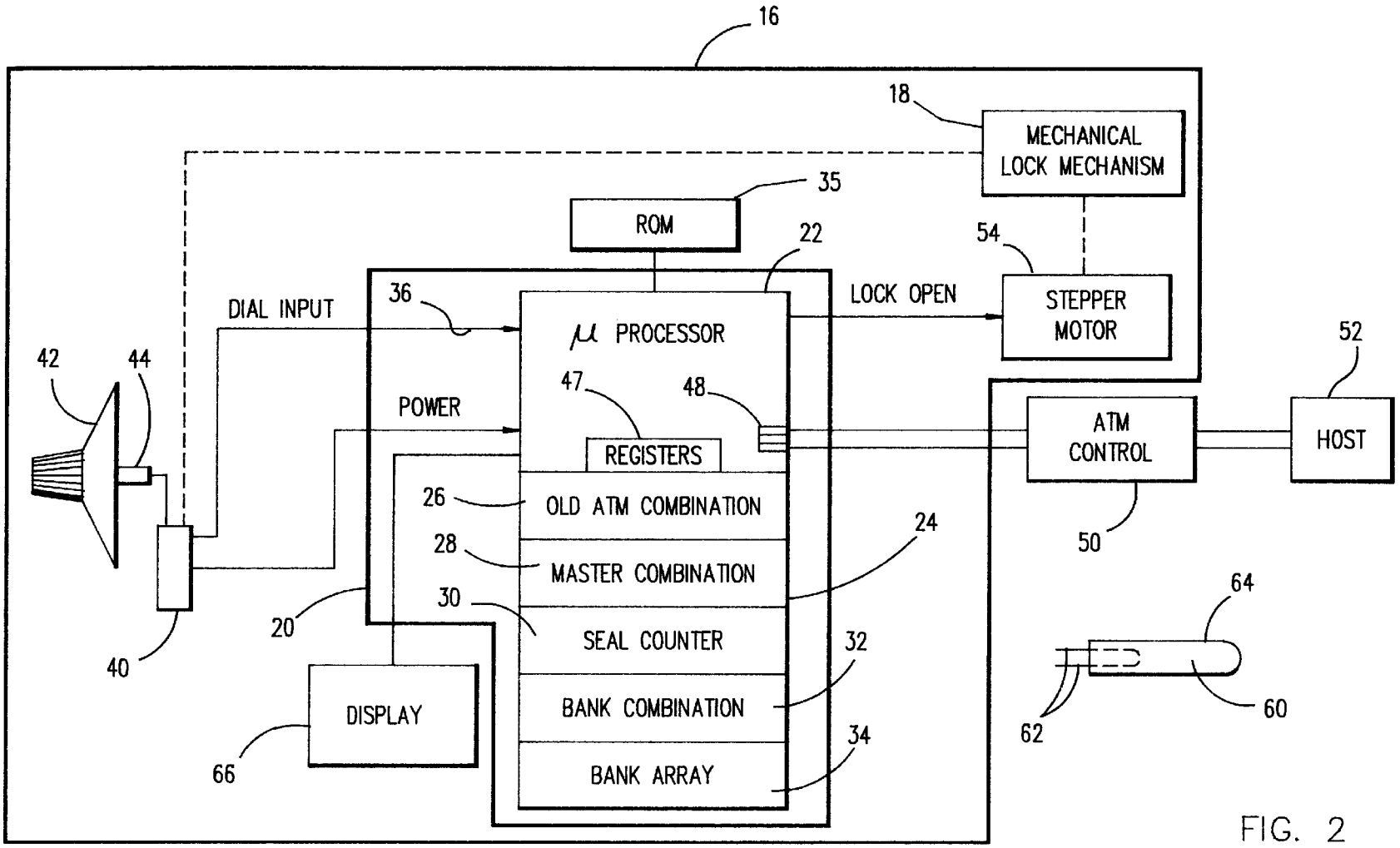
FIG. 2 is a block diagram representation of the electronic lock and its connection to the ATM control and host computer supervising the ATM.

FIG. 2 illustrates in block diagram form the electronic control of lock 16 as shown in FIG. 1, as regards the innovative features of this invention.

Since mechanically the ATM lock 16 is identical to the Mas-Hamilton Group X-07 lock, the mechanical elements of the lock 16 are not illustrated in detail but only in block diagram form as 18 in FIG. 2.

Electronic lock control 20 is comprised of a microprocessor 22 and memory 24, along with necessary support electronic circuitry as is conventional for the operation of such a microprocessor 22.

The preferred microprocessor 22 is an Intel 8051 which is manufactured by the Intel Corporation of Santa Clara, Calif. 95051.

It should be understood that other microprocessors by other manufacturers may be used if desired, with only those modifications being made that are necessary to support and operate that selected microprocessor in accordance with requirements set forth by the particular microprocessor manufacturer.

Memory 24 may be an on-chip memory in the microprocessor 22 or an auxiliary memory connected to the microprocessor 22 in a conventional manner, as desired by the individual implementing the invention.

Memory 24 is a non-volatile type memory which retains information after electrical power is no longer provided to the memory for purposes of operating the memory.

Memory 24 is provided with at least sufficient storage locations for the old ATM combination in memory segment 26, a master combination in memory segment 28, a seal count in memory segment 30, a bank combination in memory segment 32 and a bank array in memory segment 34.

The microprocessor receives a dial input over line 36. The dial input is a series of electrical pulses generated by generator 40 which is in turn operated by rotation of dial 42 and shaft 44 by the operator. The generator 40 also powers the electronic controls 20. The input function may be provided by a push button or key pad entry device, a card reader, and electronic memory reader, or a data interface, if desired. The microprocessor 22 is provided with a change key port 48 which is normally used to condition the microprocessor 22 to accept a change in the bank combination, reset the bank mode, or to initialize the lock 16. The change key port 48 may be electrically connected to a suitable connection on the ATM control 50 to indicate to the ATM control 50 that a condition exists which corresponds to a predetermined condition, thereby indicating that the lock 16 is being operated under duress. The ATM control 50 is typically connected to a host computer 52 for purposes of control and authorization of the ATM 10 functions and transactions, as well as for monitoring security of the ATM unit 10.

The ATM control 50 may be conditioned to report the condition of the lock 16 as indicated on the change key port 48 to the host computer 52 thereby accomplishing a silent alarm in the event that the lock 16 is being operated under duress. Thus, the change key port 48 may be used to act as a silent alarm port if a combination is entered and the last number entered through rotation of the dial 42 are offset by a constant predetermined increment from that of the ATM combination numbers. For example, if a combination of 30 60 27 is the authorized combination to be used to gain access to the lock, the entry of the combination as 30 60 37, the last number being offset by 10 from the authorized combination, would indicate that a duress condition exists and provide a signal to the change key port 48 and would be conveyed to the ATM control 50. Upon receipt of the signal from change key port 48, ATM control 50 then would initiate an appropriate signal to the host computer 52 indicating to the operator of the host computer 52 that the ATM vault 12 was being opened under a condition of duress so appropriate response personnel could be notified.

The best mode of the preferred embodiment is the incorporation of the microprocessor 22 into the electronic control 20 and operation of the microprocessor 22 by a control program. The program dictates the operation of the electronic control 20 which in turn controls the lock 16 operation. The program is represented in flow diagram form in FIGS. 4 through 8. The control program for the microprocessor 22 may be written by one of skill in the art of computer programming, using the flow digrams as a guide to the functions to be performed and the operations to be coded.

The preferred embodiment is an Intel 8051 microprocessor sold by Intel Corporation of Santa Clara, Calif. 95051.

The flow diagram of FIGS. 4 through 8 may be used as a guide from which to write the program for any other brand of microprocessor 22 selected.

While the structural, mechanical and electrical components of the lock 16 are the same as the Mas-Hamilton X-07 lock, the present control program when combined with the prior control programs and the mechanical and electrical components result in an improved lock 16 which differs from the X-07 lock in substantial aspects of operation and capability.

Figure 4:
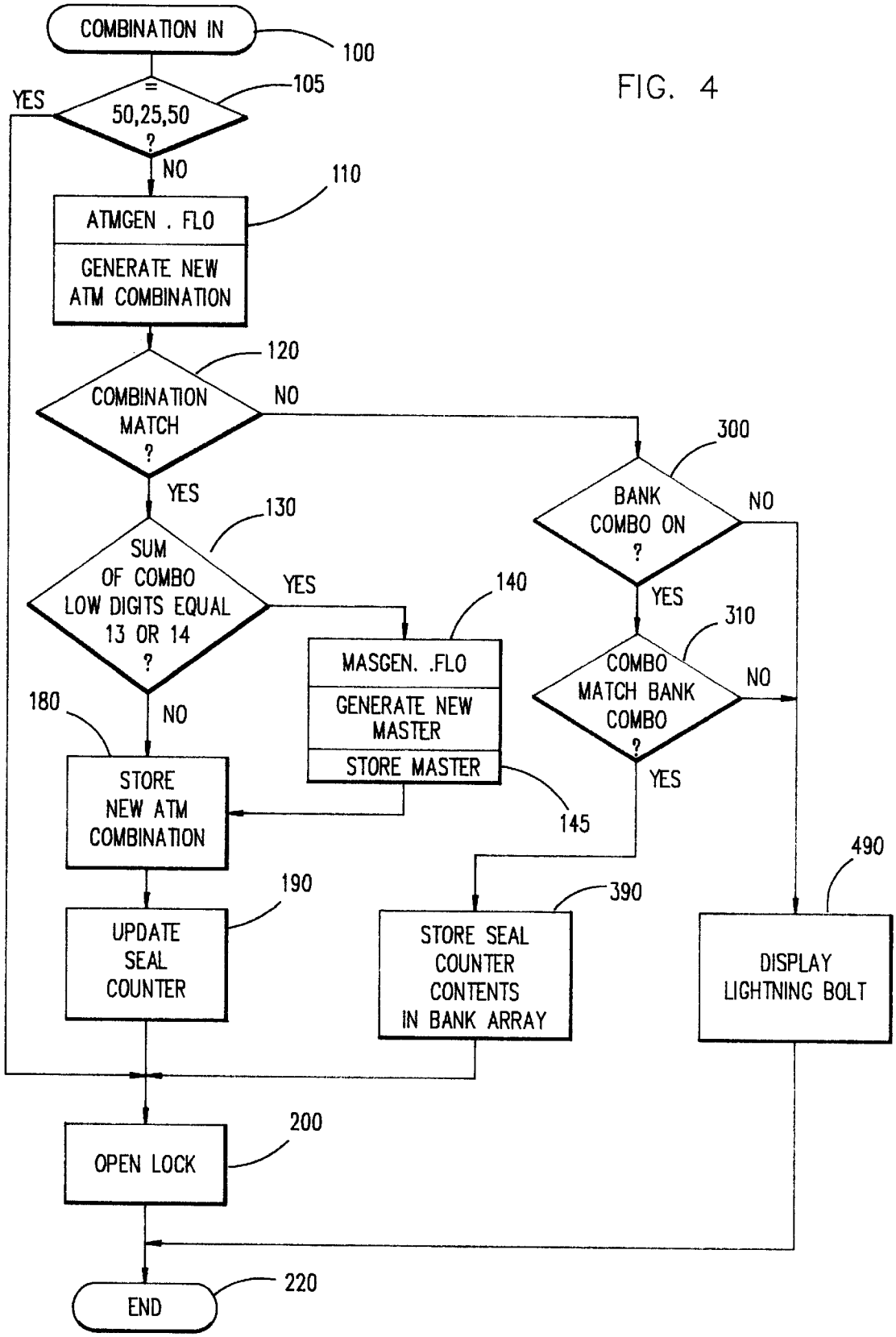
FIG. 4 illustrates the operation of the lock of FIG. 2, in flow diagram form with respect to the opening procedure of the lock.

The flow diagram of FIG. 4 illustrates the operation of the lock 16 under program control and assumes that a combination has been entered into the lock 16 through rotation of dial 42 illustrated in FIG. 2 as is conventional with the Mas-Hamilton X-07 lock. With the starting point for the diagram in FIG. 4 being the complete entry of the combination at block 100, the lock electronic control 20 in FIG. 2 then will test the combination in operation 105 for equality to 50 25 50 to open the lock in operation 200 for factory setup condition. If the combination is not equal to 50 25 50 the control program and microprocessor will generate a new ATM combination in operation 110. Operation 110 will be explained and expanded below.

After the new ATM combination has been generated in operation 110, the new ATM combination is compared in operation 120 with the entered combination for identity. If found identical, a check is made to determine if the low order digits of each of the numbers of the combination when added together equal either 13 or 14.

By way of example, if the combination of 58 21 94 is the result of the new ATM combination generation operation in operation 110 and the entered combination matches in operation 120 the sum of the low order digits, 8, 1 and 4 equals 13, resulting in a branching at operation 130. When operation 130 results in an affirmative finding, a new master combination is generated in operation 140. The sums 13 and 14 are arbitrary and could be any numbers between 0 and 27. The use of two sums, 13 and 14, initiates the change of the master combination more frequently than only a single sum. The choice of 13 and 14 as the test sums will result in a master combination change about 16 times in 100 lock openings to further help disguise the authorized ATM combination. As will be seen, the master combination is an essential component of the ATM combination generation algorithm and with frequent changes will enhance security of the lock 16. The generation of the master combination in operation 140 will be expanded and explained in more detail below.

After the sum check of operation 130 or the master combination generation of operation 140, the new ATM combination is stored in memory segment 26 of FIG. 2, becoming the old ATM combination. The storing of the ATM combination overwrites the previous old ATM combination and preserves only the most recent ATM combination for use later in generating a new ATM combination.

The ATM combination stored in memory segment 26 cannot be used again to open the lock 16.

Next, the seal counter 30 is updated. The seal counter is memory segment 30 as seen in FIG. 2 and contains a sequential count of the number of times that the lock 16 has been opened using an ATM combination. The contents of the seal counter 30 is incremented by one each time the lock is opened or the vault 12 "seal" broken using the ATM combination. The seal count typically starts at 0001 for a newly manufactured lock. Upon updating the seal counter 30 in operation 190, the lock 16 is conditioned for opening in operation 200. Conditioning to open in operation 200 is accomplished by activating or pulsing stepper motor 54 to complete a mechanical chain of elements to permit opening of the lock 16, as is conventional in the Mas-Hamilton X-07 lock.

The operation of the electronic control 20 then terminates at operation 220.

When a combination entered at operation 100 fails to match the generated ATM combination in operation 120, two possibilities exist, one being the entered combination is the bank combination and the other being that the entered combination is an incorrect combination different from either the bank or generated ATM combination.

Operation 300 determines, first, whether the bank combination feature is active on the lock 16; and if not the entered combination is an error and an error signal is displayed in operation 490 prior to the operation of the electronic control 20 termination its functioning in operation 220. The enabling or disabling of the bank combination feature will be explained below.

If on the other hand the bank combination feature is active as determined in operation 300, the entered combination is compared with the bank combination stored in memory segment 32 of memory 24 at operation 310.

If a failure to compare equal in operation 310 results, the error signal is displayed in operation 490 and the operation of the electronic control 20 is terminated at operation 220.

Should a compare-equal condition exist in operation 310, the seal count found in memory segment 30 is stored in the bank array segment 34 of memory 24 indicating a relative sequence of openings to maintain an audit trail or audit condition.

The bank array 34 is a segment of memory 24 to store the last several (3, 4, or 5) seal counts indicating each time the bank combination opened the lock 16. As a new seal count is stored the oldest (smallest) value of the seal count is removed. This may be accomplished in one of several conventional ways. The bank array 34 can be used also to determine the sequence of the opening of the lock 16 by the service personnel and the bank personnel and the appropriate corresponding time frames of entry.

ATM COMBINATION GENERATION

Figure 5:
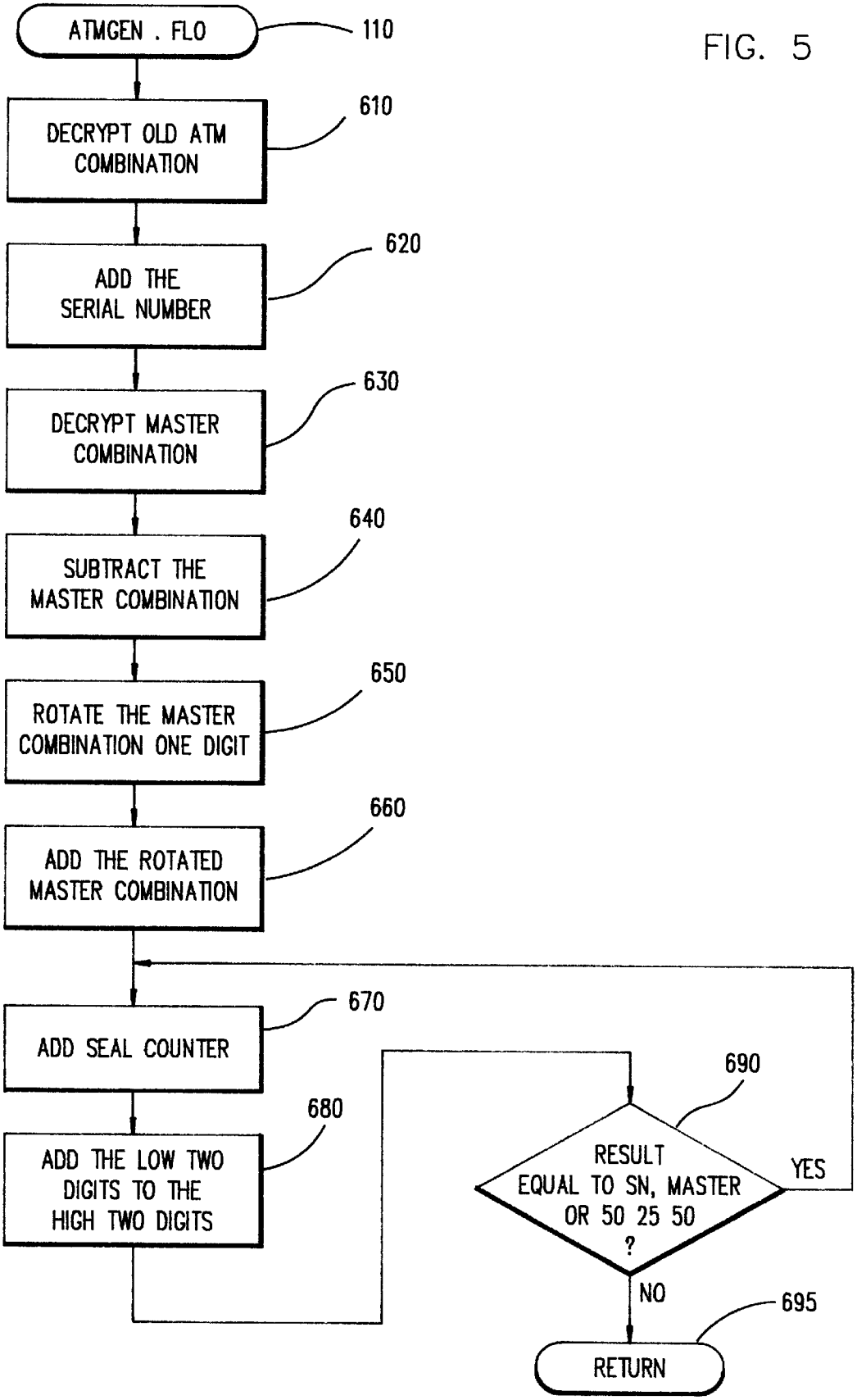
FIG. 5 illustrates in flow diagram form the ATM combination generation operation.

To expand and explain the generation of the ATM combination as represented in operation 110, designated as ATMGEN.FLO, reference is now made to FIG. 5. The flow diagram of FIG. 5 represents the steps or operations contained in the ATMGEN.FLO operation 110 of FIG. 4. Entry into FIG. 5 is at operation 110 and the old or previous ATM combination stored in memory segment 26 of memory 24 in FIG. 2 is decrypted in operation 610.

The combinations, ATM, bank and master, are typically stored in encrypted form as an added security factor; the form of encryption is not critical. The preferred encryption is to distribute the bits of a binary representation of the combination in various locations of a memory and filling the unoccupied locations in the memory with random binary bits to disguise the combination. Decryption involves removal of the random binary bits and reassemblage of the remaining bits representing combination. Other encryption/decryption schemes may be used in lieu of the preferred scheme if desired.

After the old ATM combination is decrypted in operation 610, the old ATM combination remains in a binary form. The serial number of the lock 16, stored in binary form within the lock 16, is then combined with the old ATM combination in operation 620. The form of combining is preferably adding of the two values. It should be appreciated that the combining of the values may take one of several forms such as addition, subtraction, ORing or other mathematical or logical combination of the two binary values. The resulting binary representation of the combined value then is combined with a decrypted master combination. The decryption of the master combination, stored in memory segment 28 of memory 24, follows the approach for decryption of the old ATM combination described previously. Once the master combination is decrypted in operation 630, the decrypted master combination is combined with and preferably subtracted in operation 640 from the result of the adding in operation 620. Again, it should be noted that the combining operation may be adding, ORing, exclusive ORing or other mathematical or logical combinations.

The result of combining the output of the adding operation 620 in FIG. 5 and the output of operation 640 is then further manipulated in operation 650. The manipulation preferably is a rotation of the lowest order digit to the highest order position and the shifting of all other digits down by one position. The manipulation operation may be a rotation of one, two or more digits, inversion of digits, or any other similar operation.

Once the manipulated (rotated) master combination is determined that value is added to the result of operation 640, in operation 660. Thereafter, in operation 670 the contents of the seal counter 30 are added to the result of operation 660. Since the seal count is a value of 9999 or less, the addition thereof does not affect the values of the higher order digits in the decimal representation of the value resulting from operation 670. Accordingly, it is desirable to further disguise the generation of the ATM combination by adding the lowest two digits of the decimal six digit result from operation 670 to the highest order two digits of the decimal result of operation 670, in operation 680.

The resulting combination then is tested to ensure that certain values and the resulting combination are not equal. The values which cannot be validly equalled are the lock serial number, the master combination, or the initial combination as set at the factory of 50 25 50. In the event that the generated ATM combination equals any of the designated values, then operations 670 and 680 are repeated to further alter the resulting generated ATM combination. Such repetition of operations 670 and 680 continues until such time as the combination that has been generated does not equal the serial number, the master combination or 50 25 50. When the testing in operation 690 results in a negative result, the flow returns, in operation 695, to operation 120 of FIG. 4.

Referring briefly again to FIG. 4 operation 140, the operation represents generation of a new master combination. The master combination is a value used in the generation of the ATM combination and is changed from time to time upon command of the control program. The changing of the master combination enhances the security of the lock 16.

MASTER COMBINATION GENERATION

Figure 6:
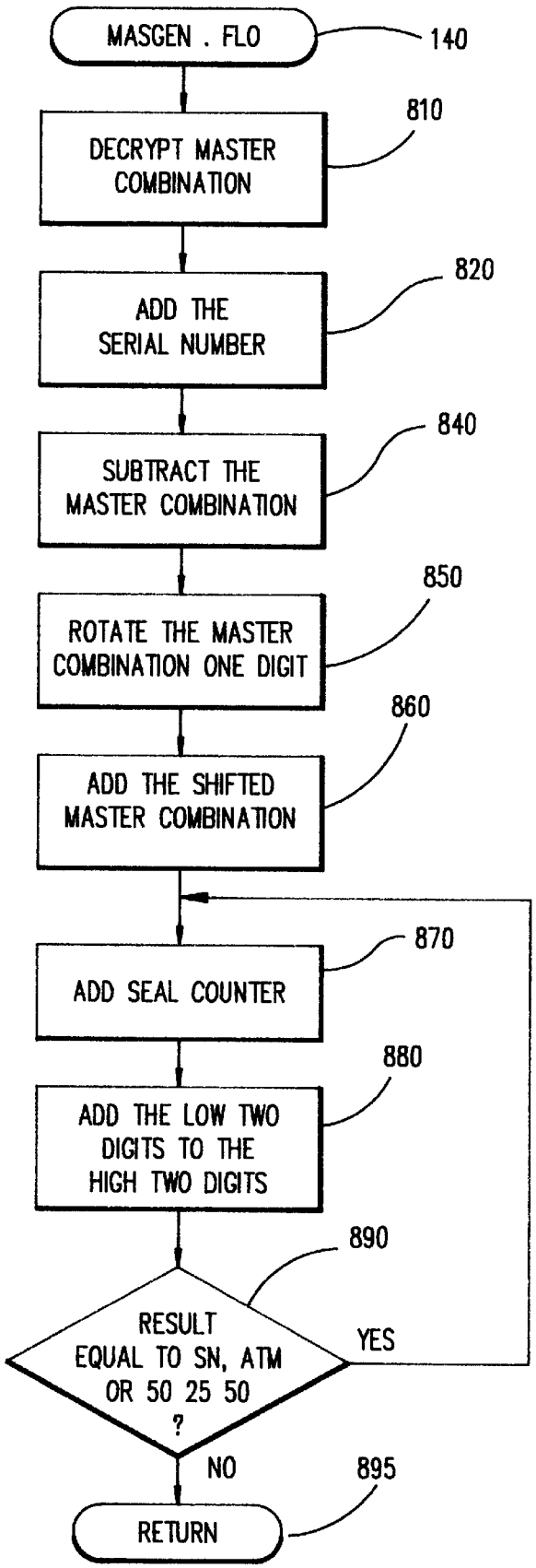
FIG. 6 illustrates the master combination generation function.

FIG. 6 is a flow diagram representing the generation function, MASGEN.FLO of operation 140. The operation generates the master combination when the conditions of operation 130 in FIG. 4 are met. The MASGEN.FLO routine in FIG. 6 is very similar to the routine illustrated and described with reference to FIG. 5.

Operations 810 and 820 are the same operations as described for operations 610 and 620 except that the master combination is operated on rather than the ATM combination of operation 610 and 620. Operation 630 of FIG. 5 does not have a corresponding operation in the sequence of FIG. 6 since the master combination has been decrypted in operation 810.

Operations 840, 850, 860, 870 and 880 are identical operations to operations 640, 650, 660, 670 and 680, respectively, of FIG. 5, except for the number that has resulted from operations 620 and 820.

In operation 890 the result of operation 880 is tested to determine if the result is equal to the lock serial number, ATM combination or the factory-delivered 50 25 50 combination. If the result of operation 880 is equal to any of the above values, then operations 870 and 880 are repeated to produce a new result which is then tested in operation 890. Upon a negative result form operation 890, the routine of FIG. 6 is ended in operation 895. Upon return to the flow of FIG. 4 at 140, the result of operation 880 is then stored in memory segment 28 as the new master combination in operation 145.

LOCK INITIALIZATION

In order to set up the lock 16 for operation, it is necessary to initialize the lock electronic control 20 to overcome the factory pre-set combination settings of 50 25 50 for all combinations and to start the generation of combinations by the lock electronic control 20. The initialization routine is illustrated in and described with reference to FIG. 7.

In order to condition the lock electronic control 20 to accept initialization, the change key 60 illustrated in FIG. 2 is inserted into the change key port 48. The change key is a jumper wire 62 and a handle 64. The jumper wire 62 when engaged with change key port 48 pulls one of the microprocessor ports to ground indicating that the microprocessor 22 should run a change routine and accept externally supplied inputs to change the combination stored in memory 24 of FIG. 2. With the insertion of change key 60 as in operation 500 of FIG. 7A, the lock is conditioned for initialization. After the change key 60 has been inserted in operation 500, a combination is entered in operation 502 by rotating dial 42 as is conventional. The entered combination, 50 25 50, is compared with the ATM combination in operation 505; and when a match occurs, the entered combination is tested to determine if the entered combination is 50 25 50, the factory set ATM combination, in operation 510. Should the entered combination be equal to the factory set ATM combination of 50 25 50, then the initialization routine continues. Otherwise, if the entered combination disagrees with the factory set value, the lock has been previously initialized and may not be reset or re-initialized. Since no resetting is possible, an error is signalled in operation 570 and the initialization routine is ended at operation 560.

When the entered combination matches the factory set value for the ATM combination in operation 510, the lock electronic control 20 requests the entry of the lock serial number in operation 515. Since the lock serial number is found only within the case of lock 16, the serial number may be ascertained only by someone having access to the lock in a disassembled state or by opening the lock housing 17, as viewed in FIG. 1. The serial number of the lock 16 is dialed into the electronic control 20 in operation 517; and in operation 520 the entered number is verified as the serial number of the lock 16 as stored in ROM memory 35 of FIG. 2. If the entered serial number and the lock serial number do not match in operation 520, an attempt is being made to initialize the improper lock and the initialization routine is terminated with an error signal in operation 570 and an ending operation 560.

When the entered serial number matches the serial number stored in ROM 35, a new master combination is generated in operation 525. Operation 525 is the same as operation 140 of FIG. 4 and is represented in expanded form in FIG. 6 and explained above.

Due to the master combination being stored as 50 25 50 by the factory, the 50 25 50 master combination will be used by the electronic control 20 to create the new master combination in accord with FIG. 6.

Thereafter, the new ATM combination is generated in operation 530 in accord with the sub-routine of FIG. 5. The factory set ATM combination of 50 25 50 is used as the old ATM combination in the routine of FIG. 5. Upon return from the routine of FIG. 5, the new ATM combination is flashed on display 66 to inform the operator in operation 535 of the ATM combination that may be used to open the lock.

The next step, operation 540, is to remove the change key 60 from the change key port 48; and the operator then dials into lock 16 the ATM combination which was just flashed to the operator to confirm the combination. The dialed ATM combination is compared to the combination generated in operation 530 to confirm the combination in operation 545. If the two combinations do not compare equal in operation 545, the process is terminated in operation 560 after an error signal is displayed in operation 570. If the two combinations do compare equal in operation 545, then the new ATM combination is stored in memory segment 26 of memory 24 in FIG. 2 in operation 550 followed by the new master combination being stored in memory segment 28 by operation 552.

The lock electronic control 20 then conditions the lock 16 to be opened in operation 555. Thereafter, the initialization routine is terminated at operation 560.

However, if the dialed combination is not a match for the ATM combination in operation 505 of FIG. 7A, then the dialed combination is compared to the bank combination in operation 1000 in FIG. 7B. If they compare equal, there is a check in operation 1010 to see if the bank combination feature is active. If the determination is that the bank combination feature is not ON, then the electronic control 20 will request, in operation 1015, entry of the master combination and the master combination from memory segment 28 is compared with the dialed number in operation 1020. The master combination must be entered manually to ensure that the operator has both the master combination and the bank combination as a security measure even though the master combination does exist in the memory 24.

If the entered master combination equals the stored master combination, in operation 1020, both the bank and master combinations have been entered and under this condition the bank combination feature is turned ON or activated in operation 1025.

If the bank combination feature is active, the condition in operation 1010 is true and operations 1015, 1020 and 1025 turning on the bank combination feature are bypassed. The flow from operation 1010 or operation 1025 is to operation 1030 where the bank combination is generated. Operation 1030 will be explained and expanded in more detail below. The newly generated bank combination is flashed back in operation 1035 to the operator so that the bank combination may be entered by the operator to confirm the combination. After the combination is flashed back in operation 1035, the change key 60 is removed at operation 1040 and the bank combination entered in operation 1042. The entering of the new bank combination confirms the bank combination and opens the lock 16, as well as allowing a way to abort the routine by entering an invalid combination. The lock 16 must be opened in order to close the vault door 14. The bank combination and the dialed bank combination are compared at operation 1045; if not equal, an error is signalled at operation 1065 and the routine ended at operation 1060.

If, on the other hand, the two combinations are equal at operation 1045, the new bank combination is stored at operation 1050. The lock is then conditioned to open in operation 1052 and thereafter the routine is terminated at operation 1060.

The combination entered at operation 502 which does not compare equal with the ATM combination in operation 505 or the bank combination at operation 1000 then is tested for equality with the serial number of the lock at operation 1070. If the entered number is not equal to the serial number, then the error signal is displayed at operation 1080 and the routine ended at operation 1085. Should the number entered equal the lock serial number, a second combination is requested at operation 1075 and a combination is entered at operation 1080. The entered combination can be either the master combination or the bank combination. If the entered combination is equal to the master combination, as determined in operation 1090, the bank array contents will be displayed in operation 1095. if the entered combination is not the master combination but is equal to the bank combination as determined in operation 1100 the bank combination feature is turned OFF in operation 1105 and the lock conditioned to open in operation 1110. In operation 1100 if the dialed combination is not equal to the bank combination, then an error signal is displayed in operation 1080. Following operation 1080, operation 1095 or operation 1110 the routine ends in operation 1085.

The routine illustrated in FIG. 8 is an expanded version of the BANKGEN.FLO operation 1030 of FIG. 7B. The old bank combination as stored in memory segment 32 in FIG.

2 is decrypted in operation 710 in a like manner to the decryption of the ATM combination as described above in operations 610 through 695 in FIG. 5.

Operations 720, 730, 740, 750, 760, 770 and 780 are identical operations to operations 620, 630, 640, 650, 660, 670 and 680 of FIG. 5 with the exception that the input value from operation 710 is the old bank combination rather than the old ATM combination resulting from operation 610.

The result of operation 780 is compared against the ATM combination, the master combination, the serial number and 50 25 50 to ensure that none of these values are the same as the newly generated bank combination. If none of the above values compare with the result of operation 780, the logic flow returns to the logic flow of FIG. 7B at operation 1035.

In the event of a compare-equal condition to one of the values compared in operation 790, the process loops back to repeat operations 770, 780 and 790 until such time as the compare-equal condition is not met with respect to each of the values.

From the foregoing it can be appreciated that after initialization, the lock 16 will generate a new combination each time a combination is entered and the lock 16 opened. The combination entered must be generated by a system which performs the same generation algorithm using the identical input factors in order that the combination resulting from the dispatch system will be in synchronism and will be exactly replicated by the generation routines in the lock 16. The generated combinations from both the lock 16 and the generating system (dispatch system) will be identical if the same algorithm and input factors (old ATM combination, master combination and seal count) are used. Thus, a one-time usable combination may be generated for entry into the lock 16.

The lock 16 automatically will change the master combination whenever a predetermined condition exists to further disguise the generation of the ATM combination. As each ATM combination is used, it becomes an invalid combination with respect to opening the lock 16 a second time. The bank combination feature may be turned ON by entering the bank combination and the master combination with the change key inserted in the change key socket 48. To turn OFF the bank combination feature, the change key 60 must be inserted and the serial number and the bank combination of the lock 16 entered by dialing.

DISPATCH SYSTEM

Figure 3:
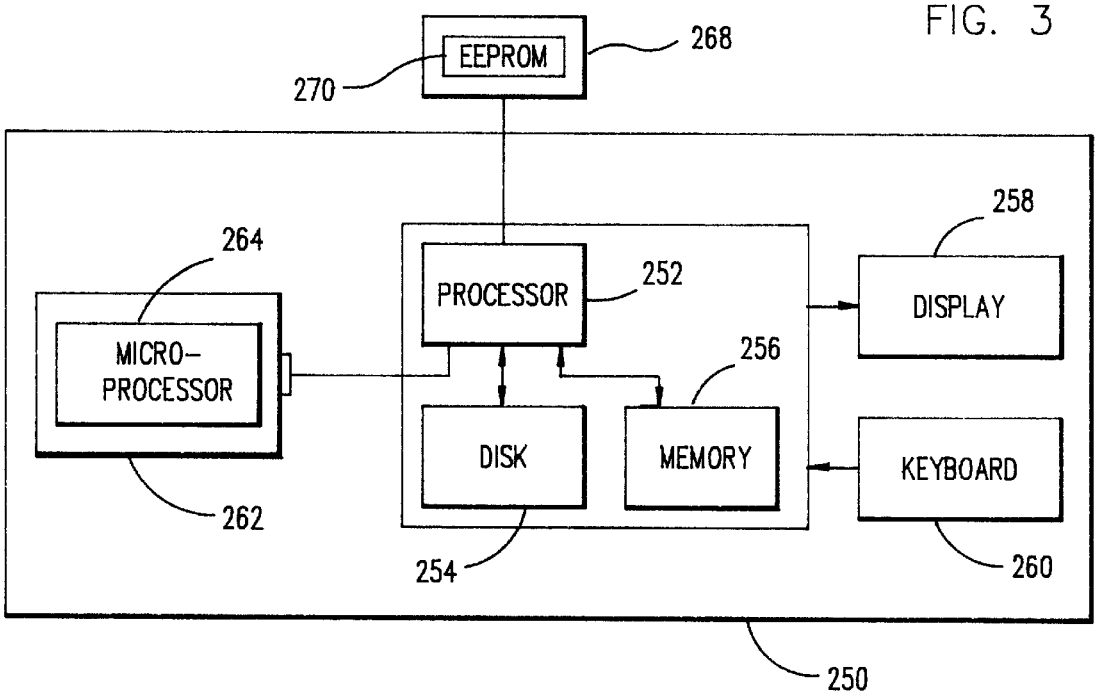
FIG. 3 is a block diagram representing a computer with a special adapter card attached thereto to generate the combinations that are used to operate the lock of FIG. 2.

The generation of the ATM combination, the bank combination and master combination by the dispatch system is accomplished by the system diagrammatically represented in FIG. 3. Dispatch system computer 250 is comprised of a processor 252, disk drive 254, memory 256, a display 258 and keyboard 260. Computer 250 is further provided with a special adapter board 262 which carries thereon a microprocessor 264 identical to the microprocessor 22 of the lock electronic control 20 in FIG. 2. Both microprocessor 264 and 22 are controlled by the same program to perform the same algorithm, responding to input of combinations, serial numbers and seal counts. The computer 250 serves as the control to prevent unauthorized access to microprocessor 264 and further provides a vehicle to store the serial numbers, the ATM combinations, the bank combinations, master combinations and seal counts for several locks 16. The adapter board 262 may be inserted into an expansion slot 266 in computer 250 or cable-connected as desired.

As a further security measure, computer 250 is further conditioned to only call the adapter card when key 268 is connected to the computer 250. Key 268 is a plug which controls an EEPROM 270. Stored in the EEPROM 270 is a code number which must compare to the identical number embedded in processor 264. Also the key may contain data that controls access to the ATM combination, master combination or bank combination so that only an authorized individual has access to only that combination they are authorized to access. Thus, a bank key, a supervisor key and a dispatcher key may exist to access the bank combination, the master and ATM combinations and the ATM combination, respectively.

The primary difference between the electronic control 20 of lock 16 and the dispatch system of FIG. 3 is that the combinations generated by the dispatch system of FIG. 3 will be displayed so that the combinations can be recorded and transferred to the personnel going to the ATM for service or maintenance operations.

With the knowledge of the various values and the algorithm for combining those values, a combination generation function may be performed manually if necessary. As may be appreciated from the foregoing, a dispatcher may generate an ATM combination, a bank combination or master combination using the dispatch system of FIG. 3 and give the generated combination to the authorized person. When that person uses the combination provided to open the lock 16, the electronic controls 20 generate a combination which will be identical and which will authorize the opening of the lock 16.

When lock 16 is opened with an ATM combination, the combination used to open it is stored and no longer valid. That ATM combination cannot be used to open the lock 16 a second time. If access to the locked vault 12 is needed a second time, a new combination must be secured from the dispatcher where it is generated in a manner identical to the previously used combination.

This arrangement prevents a person who has had authorized access to a vault 12 from returning to open the vault 12 and remove money therefrom without authorization.

The essential aspects of the algorithm involve combining the different values in varying ways in order to generate a new combination. The preferred combinations of values are described above but are only exemplary. It should be understood that the combining of the values may be accomplished by use of any mathematical operation or logical combining operation and that the order in which the values are treated, likewise, are arbitrary and may be arranged in a different order if desired. It also should be understood that a plurality of algorithms may be programmed into the microprocessors 22 and 252 and one of several such algorithms may be selected with a change in the algorithm being commanded upon the lock 16 being operated a predetermined number of times using a particular algorithm.

The lock may be provided with a data port or connection, to which an electronic key may be connected. Keys of the type marketed by Dallas Semiconductor Corporation, Dallas, Tex., may be used to contain and provide to the electronic control of the lock, among other information, the personal identifier of the operator or the key identifier (PIN), date and time, an encrypted combination, other values or parameters for use by the lock as desired, and memory which may be used to record data about the date and time of the operation of the lock for audit trail purposes.

It should be noted that while specific logical and mathematical combinations have been illustrated and described, in the generation of the various lock combinations, the combining of predetermined values and the systematic and consistent altering of the results of some of the combining steps are only illustrative; that the generation of new combinations, whether they be the ATM combination, the master combination, or the bank combination may be generated by any number of different mathematical or logical functions. The essential aspect of the invention is that the combination to be used to open the lock 16 can be generated by a separate system known as a dispatch system of FIG. 3 and by the lock 16 when the combination is entered into the lock 16; therefore, the combination to authorize the opening of the lock 16 is changed after each use and the combination does not reside in the lock 16 in any memory at any time except when the lock 16 is being operated and powered. Therefore, the attack of the lock 16 in any manner to obtain the combination by reading information from the electronic control 20 of the lock 16 will be prevented by virtue of the fact that the ATM combination to be used to open the lock 16 the next time does not even exist in the lock 16 prior to a combination being entered into the lock 16.

It should be appreciated that these changes and modifications to the preferred embodiment and other similar changes may be made by one of skill in the art without removing such activities from the scope of the invention as defined in the attached claims.

We claim:

1. An electronic combination lock comprising:

an input dial for inputting numbers of a combination into said lock;

a display for displaying numbers;

an electronic control means for receiving said numbers of said [combinations] *combination* and for comparing said numbers with numbers of an authorized combination;

said electronic control means including:

[an encrypting] *a* combination [generator] *generating means* responsive to an entered combination for [encrypting predetermined data and for] generating a combination derived from [said] predetermined data;

a comparator for comparing said entered combination with said generated combination and, responsive to a compare equal, to generate a signal permitting said lock to open[,]*;* said [encrypting and] generating means responsive to [a last accepted combination, a parameter unique to said lock, a master combination,] *at least two values, at least one of said at least two values comprising* a variable value, *wherein* said variable value *is* changed in a predictable manner upon each opening of said lock to form a result and *a* manipulation of said result[,] to generate said authorized combination*;*

*said electronic control means responsive to a finding of equality of said authorized combination and said combination to condition said lock to open.*

2. The lock of claim 1 wherein said electronic control means comprises storage means for storing said entered combination upon said entered combination equalling said generated authorized combination.

3. The lock of claim 1 wherein said electronic control means further includes a counter, contents of said counter *being* incremented upon each comparing *being* equal [of] *to* said entered combination and said generated combination, said counter contents being said variable value.

4. The lock of claim 1 wherein said electronic control means further includes means for generating a new master combination responsive to said authorized combination meeting a predetermined criteria.

5. The lock of claim 4 wherein said criteria is that a sum of predesignated digits of said authorized combination equals a predetermined value.

6. A method of providing an electronic combination lock with a single use authorized combination for opening said lock comprising the steps of:

receiving a new combination into said lock;

responsive to said receiving said new combination, generating an authorized combination based upon [previously used authorized combination, a value unique to said lock, a randomly alterable master combination,] *at least two values, at lest one of said at least two values comprising* a variable value [unique to said lock and a mathematical combining of predesignated digits of said entered combination];

comparing said generated, authorized combination with said entered combination[,]*;* and responsive to [said] *a* compare equal condition therebetween, [replacing said previously used authorized combination with said generated authorized combination, and] providing an electrical authorization signal to condition said lock to be opened.

7. The method of claim 6 further comprising the steps of:

testing said authorized combination for equality to at least one condition;

responsive to said condition being equalled, altering said randomly alterable master combination to create an altered master combination[,]*;* and replacing said randomly alterable master combination with said altered master combination.

8. The method of claim 6 additionally including steps of incrementing said variable value by a fixed increment upon successful comparison of said new combination and said authorized combination.

9. The method of claim 7 additionally including steps of incrementing said variable value by a fixed increment upon successful comparison of said new combination and said authorized combination.

[10. A computer system for generating a combination for operation of a lock comprising:

a memory for storing one fixed numerical value unique to a designated lock and at least three variable numerical values;

a computer processor;

a control program for controlling said processor to perform a predetermined sequence of operations involving a predetermined fixed numerical value and at least two variable numerical values;

said sequence of operations including at least a first operation of combining one variable numerical value and one fixed numerical value, producing a first result; a mathematical combining of a second variable value with said first result producing a second result, a rearranging of digits of said second variable numerical value, a mathematical combining of said second result and said rearranged value, producing a third result, adding two digits of said third result to two predesignated digits of said third result, producing a fourth result, and providing said result for the opening of a lock.]

[11. The computer system of claim 10 wherein said control program defines said first operation of combing as exclusive ORing.]

[12. The computer system of claim 10 wherein said control program defines said first operation of combining as a mathematical combining.]

[13. The computer system of claim 10 wherein said two operations of mathematical combining are each addition or subtraction with the two operations being different.]

[14. An electronic combination lock having a computer for controlling operation of said lock, said computer comprising:

A bolt, a bolt withdrawal mechanism including an actuator responsive to said computer for enabling withdrawal of said bolt;

said computer further comprising:

a memory for storing one fixed numerical value unique to a designated lock and at least three variable numerical values;

a computer processor;

a control program for controlling said processor to perform a predetermined sequence of operations involving a predetermined fixed numerical value and at least two variable numerical values;

said sequence of operations including at least a first operation of combining one variable numerical value and one fixed numerical value, producing a first result; a mathematical combining of a second variable value with said first result producing a second result, a rearranging of digits of said second variable numerical value, a mathematical combining of said second result and said rearranged value, producing a third result, adding two digits of said third result to two predesignated digits of said third result, producing a fourth result;

said computer processor responsive to said control program to compare said fourth result to a combination generated on a computer system performing identical operations in an identical sequence, using identical fixed and variable values;

said computer responsive to a finding of equality of said fourth result and said combination to signal said actuator to enable said bolt withdrawal.]

15. An electronic combination lock comprising:

an input for entering numbers of a combination into said lock;

an electronic control for receiving said numbers of said combination and for comparing said numbers with numbers of an authorized combination;

said electronic control including:

[an encrypting] *a* combination generator responsive to an entered combination [for encrypting predetermined data and] for generating a combination derived from [said] predetermined data;

a comparator for comparing said entered combination with said generated combination and, responsive to a compare equal condition to generate a signal, permitting said lock to open[,]*;* said [encrypting and] generating means responsive to a last accepted combination, a parameter unique to said lock, a master combination, *and* a variable value, *wherein* said variable value *is* changed in a predictable manner upon each opening of said lock to form [an interim value] *a result* and *a* manipulation of said [interim value,] *result* to generate said authorized combination.

16. The lock of claim 15 wherein said electronic control comprises storage means for storing said entered combination upon said entered combination equalling said generated authorized combination.

17. The lock of claim 15 wherein said electronic control further includes a counter, contents of said counter incremented upon each comparing equal of said entered combination and said generated combination, said counter contents being said variable value.

18. The lock of claim 15 wherein said electronic control further includes a combination generator for generating a new master combination responsive to said authorized combination meeting a predetermined criteria.

19. The lock of claim 18 wherein said criteria is that a sum of predesignated digits of said authorized combination equals a predetermined value.

*20. A method of providing an electronic combination lock with a single use authorized combination for opening said lock comprising the steps of:*

*receiving a new combination into said lock;*

*responsive to said receiving said new combination, generating an authorized combination based upon a previously used authorized combination, a value unique to said lock, a randomly alterable value, and a variable value unique to said lock;*

*comparing said generated, authorized combination with said entered combination;*

*responsive to a compare equal condition therebetween, replacing said previously used authorized combination with said generated authorized combination; and*

*providing an electrical authorization to condition said lock to be opened.*

*21. The method of claim 20 further comprising the steps of:*

*testing said authorized said combination for equality to at least one condition;*

*responsive to said condition being equaled, altering said alterable value to create an altered value; and*

*replacing said alterable value with said altered value.*

*22. The method of claim 20 additionally including a step of incrementing said variable value by a fixed increment upon successful comparison of said new combination and said authorized combination.*

*23. The method of claim 21 additionally including a step of incrementing said variable value by a fixed increment upon successful comparison of said new combination and said authorized combination.*

* * * * *